June 15, 1926.
C. B. BAILEY
GASKET
Filed June 15, 1925
1,589,040
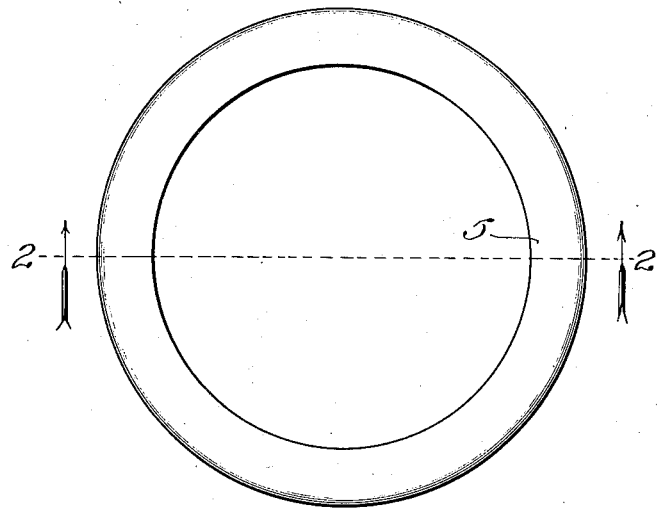
Inventor
Claude B. Bailey,
By Eugene Ewann
Atty.

Patented June 15, 1926.

1,589,040

UNITED STATES PATENT OFFICE.

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE.

GASKET.

Application filed June 15, 1925. Serial No. 37,041.

The gasket contemplated by this invention has its pressure receiving portion composed of a plurality of superimposed folds or layers formed from a single piece of sheet metal to take the place of the asbestos cushion heretofore generally employed in conjunction with sheet metal gaskets, thereby enabling the gaskets to be made entirely of sheet metal to simplify the structure and reduce the cost of manufacture thereof.

The invention has reference to the particular manner of folding the gaskets that the thickness of the same may be increased or decreased to vary the number of folds and thereby make gaskets adaptable to provide tight joints for rough as well as finished surfaces between which the gaskets are clamped.

The invention consists further in the matters hereinafter described and claimed.

In the accompanying drawings—

Fig. 1 is an elevational view of a gasket embodying the features of my invention; and Fig. 2 is a diametrical sectional view on line 2—2 of Fig. 1.

The gasket shown is made entirely from sheet metal, as copper, brass, aluminum, zinc, or the like, and is folded from a single piece of that material to have a plurality of superimposed folds or layers 1 to 5, inclusive. The folding is such that the layers 1 and 2 are integrally connected by the folded edge of the metal about the outer edge of the gasket, while the layers 2 and 3 are similarly connected by the folded metal adjacent the inner edge of the gasket. The layers 1 and 4 are integrally connected by the folded portion 6 of the metal around the inner edge of the gasket. This portion 6 extends over the folded connection between the layers 2 and 3. The layers 4 and 5 are integrally connected by the fold in the metal about the outer edge of the gasket.

The layers 1 and 5 are disposed in parallel relation to each other and to the plane of the gasket. These layers, as shown in Fig. 2, form the body or pressure receiving portion of the gasket and are slightly spaced apart with the metal under tension so that the gasket body will yield to a clamping pressure when exerted thereon to provide a tight joint.

By increasing or decreasing the number of folds or layers making up the gasket, the thickness of the same may be varied to suit the particular character of the surfaces between which the gaskets are clamped when in use. Thus sufficient cushion can be made by the metal to fill the interstices or other irregularities in cast or machined surfaces, without the use of asbestos or other packing material as generally heretofore employed.

I claim as my invention:

1. A gasket made from a single piece of sheet metal and folded to have a plurality of superimposed layers disposed parallel to each other and to the plane of the gasket, one of the outer layers and an intermediate layer extending clear across the gasket body and being integrally connected by the fold of metal along the inside of the body, there being a shorter layer between said outer and intermediate layers.

2. A gasket made from a single piece of sheet metal and folded to provide a plurality of superimposed layers disposed parallel to each other and to the plane of the gasket, one of the outer layers and an intermediate layer extending clear across the gasket body and being integrally connected by the fold of the metal around the inner edge of the gasket with the shortest layer between the outer and intermediate layers and being integrally connected by the fold in the metal adjacent the connecting portion of the outer and intermediate layers.

3. A gasket made from a single piece of sheet metal and folded to have a plurality of superimposed layers disposed parallel to each other and to the plane of the gasket, the outer layers being connected with an intermediate layer by the folds in the metal along the outer and inner edges, respectively, of the gasket body, said layers extending across the gasket body, there being shorter layers between an outer layer and an intermediate layer with the shorter layers integrally connected by a fold in the metal of the gasket.

In testimony whereof I affix my signature this 11 day of June, 1925.

CLAUDE B. BAILEY.